(12) United States Patent
Lee

(10) Patent No.: US 7,734,148 B2
(45) Date of Patent: Jun. 8, 2010

(54) METHOD FOR REPRODUCING SUB-PICTURE DATA IN OPTICAL DISC DEVICE, AND METHOD FOR DISPLAYING MULTI-TEXT IN OPTICAL DISC DEVICE

(75) Inventor: Kyu Tae Lee, Pyungtack-si (KR)

(73) Assignee: LG Electronics Inc., Seoul (KR)

( * ) Notice: Subject to any disclaimer, the term of this patent is extended or adjusted under 35 U.S.C. 154(b) by 1190 days.

(21) Appl. No.: 10/373,092

(22) Filed: Feb. 26, 2003

(65) Prior Publication Data

US 2003/0190147 A1 Oct. 9, 2003

(30) Foreign Application Priority Data

Mar. 20, 2002 (KR) ............... 10-2002-0015165
Apr. 4, 2002 (KR) ............... 10-2002-0018712

(51) Int. Cl.
*H04N 7/00* (2006.01)
(52) U.S. Cl. ............... 386/95; 386/1; 386/45; 386/46; 386/98; 386/125; 386/126; 348/563; 348/564; 348/565; 348/568
(58) Field of Classification Search ......... 348/563–565, 348/589, 568; 386/95, 125
See application file for complete search history.

(56) References Cited

U.S. PATENT DOCUMENTS

| | | | | |
|---|---|---|---|---|
| 5,913,009 A | * | 6/1999 | Kuboji et al. | 386/68 |
| 6,297,797 B1 | | 10/2001 | Takeuchi et al. | 345/141 |
| 6,553,182 B2 | * | 4/2003 | Ando et al. | 386/95 |
| 6,580,870 B1 | | 6/2003 | Kanazawa et al. | |
| 2003/0133698 A1 | * | 7/2003 | Winter | 386/95 |

FOREIGN PATENT DOCUMENTS

| | | |
|---|---|---|
| CN | 1171698 | 1/1998 |
| CN | 1205794 | 1/1999 |
| CN | 1223436 | 7/1999 |
| KR | 1998-0004876 | 3/1998 |
| KR | 1998-044943 | 9/1998 |
| KR | 2000-0074305 | 12/2000 |

OTHER PUBLICATIONS

Chinese Office Action dated Mar. 10, 2006 for related application 03121685.4 (and English-language Translation).
Chinese Office Action dated Mar. 10, 2006 for related application 03121686.2 (and English-language Translation).
Korean Office Action dated Apr. 28, 2004.

* cited by examiner

*Primary Examiner*—Thai Tran
*Assistant Examiner*—Daniel Tekle
(74) *Attorney, Agent, or Firm*—KED & Associates, LLP

(57) ABSTRACT

Embodiments of the present invention relate to an apparatus. The apparatus includes a supplementary decoder and a memory. The supplementary decoder is configured to decode supplementary data. The supplementary data is associated at least one of audio data and video data. The memory is coupled to a supplemental video decoder. The memory is configured to record the start position of the decoded supplementary data. In embodiments, the apparatus includes a user input. The user input is configured to cause the apparatus to replay at least one of audio data and video data with the supplementary data starting from the start position of the decoded supplementary data stored in the memory.

14 Claims, 15 Drawing Sheets

Structure of an SPU (Sub-Picture Unit)

SPU and SP_PCK (Sub-Picture Pack)

Fig. 15

Caption Information Table

| Serach Info. | Caption_Data |
|---|---|
| Start_Address #1<br>( or Start_PTS #1) | Caption_Data_Entry #1 |
| Start_Address #2<br>( or Start_PTS #2) | Caption_Data_Entry #2 |
| Start_Address #3<br>( or Start_PTS #3) | Caption_Data_Entry #3 |
| Start_Address #4<br>( or Start_PTS #4) | Caption_Data_Entry #4 |
| Start_Address #5<br>( or Start_PTS #5) | Caption_Data_Entry #5 |
| ⋮ | ⋮ |

METHOD FOR REPRODUCING SUB-PICTURE DATA IN OPTICAL DISC DEVICE, AND METHOD FOR DISPLAYING MULTI-TEXT IN OPTICAL DISC DEVICE

BACKGROUND OF THE INVENTION

1. Field of the Invention

The present invention generally relates to playback devices.

2. Background of the Related Art

Radio and televisions are examples of devices which output audio and/or video signals. These audio and/or video signals may be in the form of radio programs, television programs, or movies. It is often desirable for a listener or a viewer to record a radio or television program. This desire is based on the ability to replay or playback the radio or television program later.

Some listeners or viewers of radio and television programs may not have a complete understanding of their radio or television program due to a language barrier. This language barrier may be that the radio or television program is in a language different from the listener or viewer's native language. Accordingly, there has been a long felt need for a listener or a viewer to enhance their understanding of a radio or television program which is in a different language than their native language.

SUMMARY OF THE INVENTION

Objects of the present invention are to at least overcome these disadvantages of the related art. Embodiments of the present invention relate to an apparatus. The apparatus includes a supplementary decoder and a memory. The supplementary decoder is configured to decode supplementary data. The supplementary data is associated with at least one of audio data and video data. The memory is coupled to a supplemental video decoder. The memory is configured to record the start position of the decoded supplementary data. In embodiments, the apparatus includes a user input. The user input is configured to cause the apparatus to replay at least one of audio data and video data with the supplementary data starting from the start position of the decoded supplementary data stored in the memory.

For example, a user may be watching a movie in a language that is not their native language. The user may be viewing the movie from a DVD player in order to gain an improved understanding of the non-native language. Accordingly, there may be times during the viewing in which the user may wish for a previously viewed segment to be repeated because they didn't quite understand the context during the first viewing. Accordingly, a user may press a user input (e.g. a learning key) which will mark a position in a segment of a movie that they are watching. Accordingly, the DVD player will then replay a short section of the movie that corresponds with the timing that the user input was pressed. This feature may help a user learn a non-native language. Accordingly, implementation of embodiments of the invention will enhance a user's understanding of a radio or television program which is in a different language than their native language.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 15 is an exemplary diagram illustrating, in the form of a table, the caption data and search information.

DETAILED DESCRIPTION OF PREFERRED EMBODIMENTS

An optical disc device (e.g., a DVD player) may be configured to read out video and/or audio data recorded as main titles on a high-density optical disc. In other words, in a DVD, read-out data is reproduced as digital images and/or audio signals. Further, a DVD may display a high quality picture and a high quality tone through an output appliance (e.g., a general TV).

In embodiments, DVDs may be recorded with caption information of diverse languages as sub-picture data. Sub-picture data may be randomly recorded as subtitles in a certain sector of a DVD so that they are reproduced and outputted in association with video and/or audio data corresponding to main titles. Caption data may be for hearing impaired persons. Caption data may also be used for other purposes (e.g., learning languages). Caption data may be recorded on a DVD to be associated with a video data stream of a main title. Accordingly, when video and/or audio data is read out during reproduction in a DVD player, sub-picture data and/or caption data may be simultaneously read out during reproduction. A user of a DVD player may view video data of a main title while identifying sub-picture data (e.g., caption information of diverse languages). A DVD player may read out and reproduce caption information from a DVD through a sub screen of the TV. Accordingly, it may be possible to efficiently enhance foreign language learning ability using an optical disk device.

A user may desire to search for and reproduce again a previously reproduced caption information during a language learning procedure carried out while viewing the caption information of diverse languages reproduced from an optical disc (e.g., a DVD). A user may desire to repeatedly reproduce a desired block of caption information. Accordingly, it may be necessary for a user to directly search for a position where sub-picture data of caption information is recorded through several key inputting manipulations. Accordingly, there may be inconveniences in use and a degradation in learning efficiency.

Figure 1:
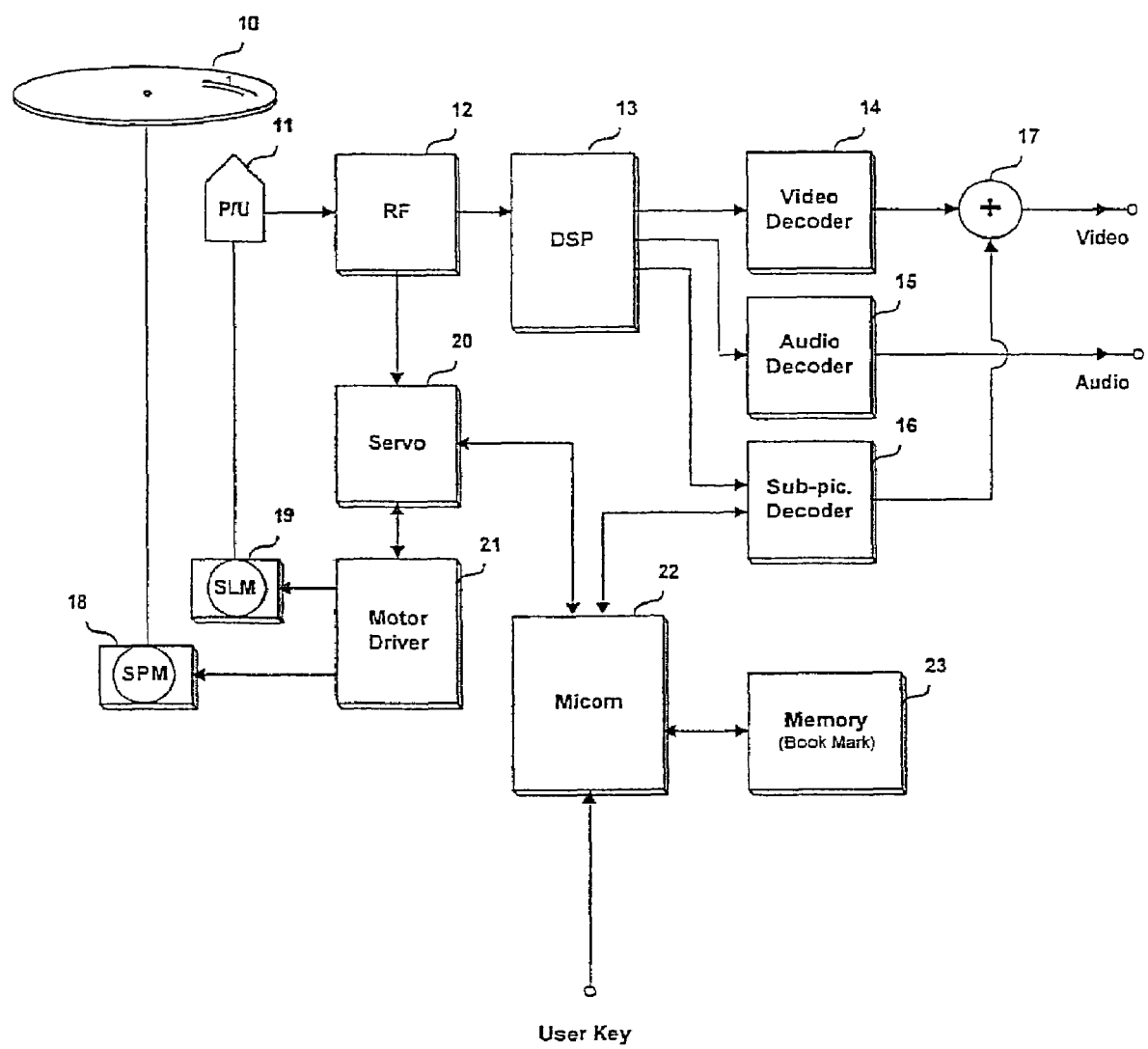
FIG. 1 is an exemplary block diagram illustrating a configuration of an optical disc device.

Embodiments of the present invention relate to a sub-picture data reproducing method. Some embodiments relate to an optical disc device (e.g., a DVD player). As illustrated in FIG. 1, an exemplary DVD player may include an optical pickup (P/U) 11, a radio frequency (RF) signal processing unit 12, a digital signal processing unit 13, a video decoder 14, and/or an audio decoder 15. The DVD player may be for reading out and reproducing video and/or audio data streams recorded on an optical disc 10. A DVD player may also include a sub-picture decoder 16 for reproducing and/or signal-processing sub-picture data (e.g., caption information of diverse languages) recorded on optical disc 10. A DVD player may include a memory 23 for storing information about recording position and reproducing time associated with a search and reproduction of sub-picture data. A DVD player may include a spindle motor 18, a sled motor 19, optical pickup 11, a motor driving unit 21, and/or a servo unit 20. Spindle motor 18 may be for rotating an optical disc. Sled motor 19 may be for shifting the position of optical pickup 11. Motor driving unit 21 and/or servo unit 20 may be for driving and controlling spindle motor 18 and/or sled motor 19. Control unit 22 may be for controlling operations of a DVD player.

Figure 2:
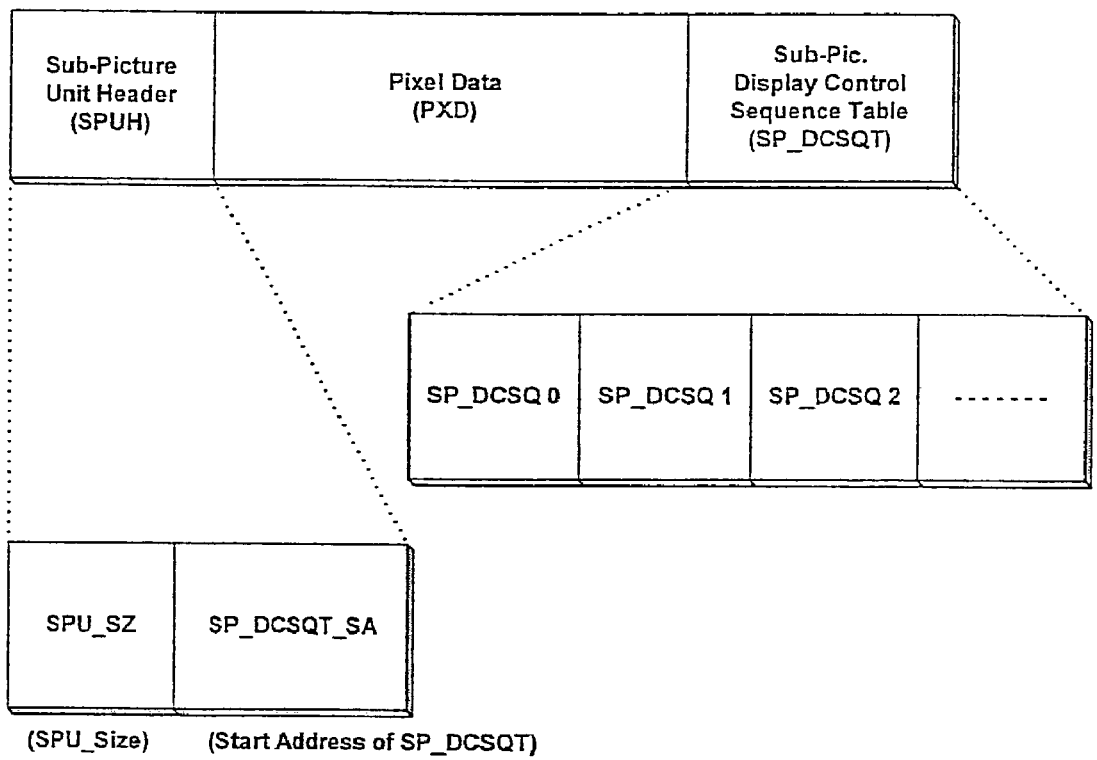
FIG. 2 is an exemplary diagram illustrating a structure of a sub-picture unit recorded in a DVD.
Figure 3:
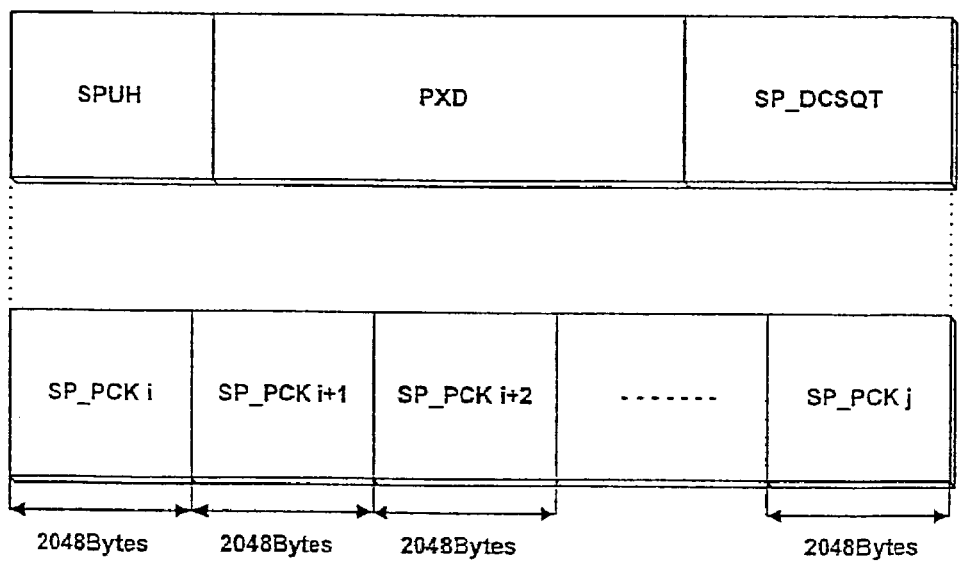
FIG. 3 is an exemplary diagram illustrating a relation between a corresponding sub-picture unit and sub-picture pack in a DVD.

In embodiments, in a reproducing operation, control unit 22 may compare a recording size of a current sub-picture unit reproduced for display by sub-picture decoder 16 with a recording size of an immediately previously-reproduced sub-picture unit. When compared sub-picture units are not equal, control unit 22 may determine that current sub-picture data is new sub-picture data. In this case, control unit 22 may store, as search information, the recording size, recording start position information, and/or presentation time stamp information of the current sub-picture unit in memory 23. This search information may be stored and managed as a bookmark. FIG. 2 is an exemplary illustration of a sub-picture unit having an exemplary structure consisting of a sub-picture unit header (SPUH), pixel data (PXD), and/or a sub-picture display control sequence table (SP_DCSQT). The sub-picture unit header SPUH may include size information of 2 bytes (SPU_SZ) for representing a recording size of an associated sub-picture unit. SPUH may include start address information of 2 bytes (SP_DCSQT_SA) for representing a recording start position from which a sub-picture displayer control sequence table (SP_DCSQT) begins to be recorded. SP_DCSQT may include a plurality of sub-picture display control sequences (e.g., SP_DCSQ 0, SP_DCSQ 1, and/or SP_DCSQ 2). Sub-picture unit having the above-described structure may be read out and reproduced in the form of a sub-picture stream consisting continuous sub-picture packs (e.g., SP_PCK i, SP_PCK i+1, and SP_PCK i+2). Each sub-picture pack may have a recording size of 2,048 bytes, as exemplified in FIG. 3.

Figure 4:
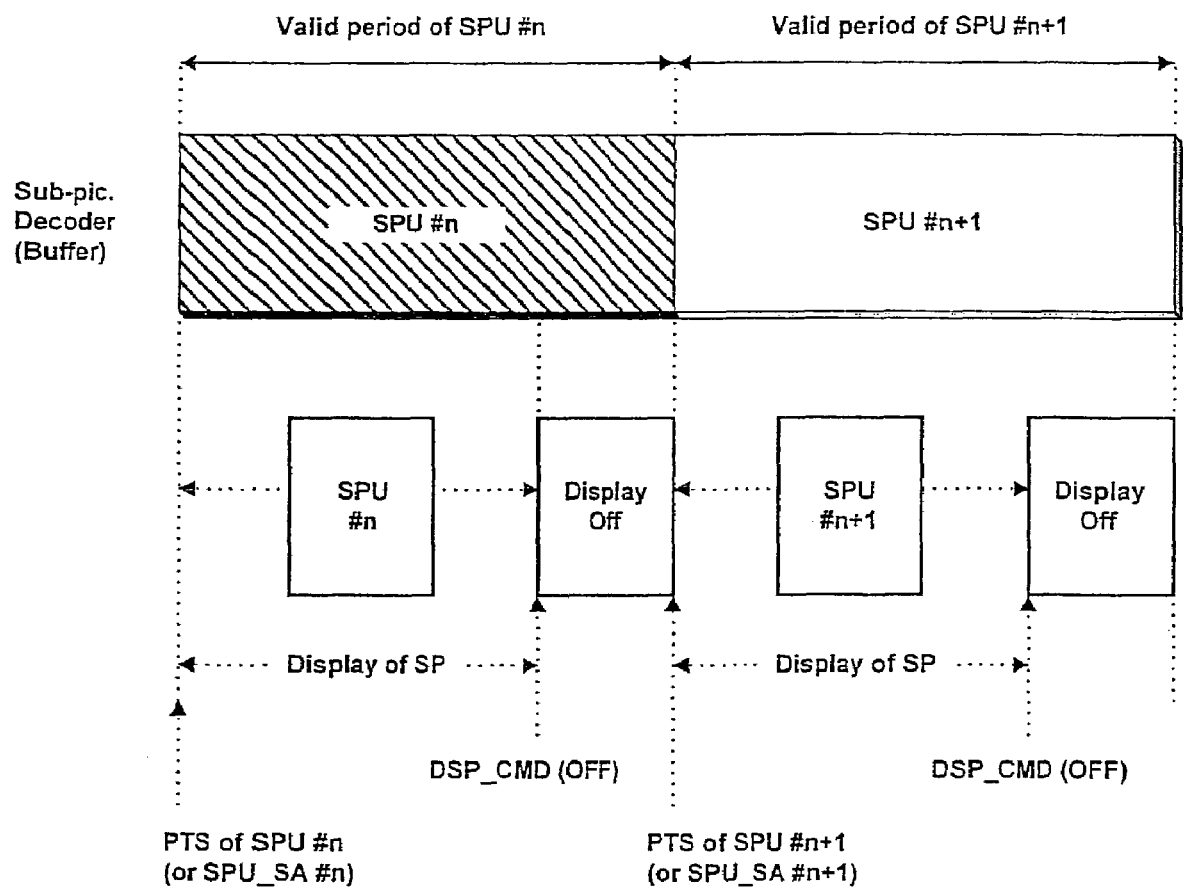
FIG. 4 is an exemplary diagram illustrating display on and display-off states of a sub-picture unit in a DVD.
Figure 5:
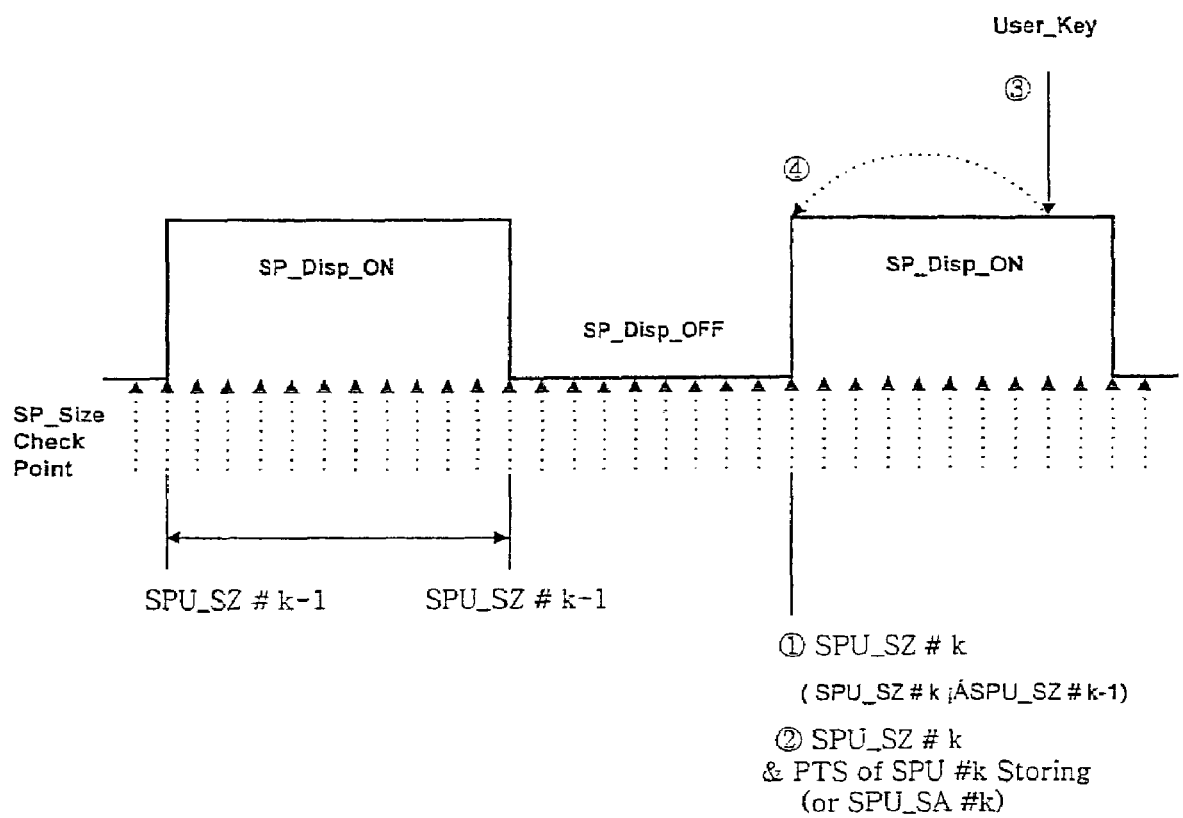
FIGS. 5 to 8 are exemplary diagrams respectively illustrating different examples of sub-picture data searched for and repeatedly reproduced in an optical disc device.

As exemplified in FIG. 4, sub-picture decoder 16 may perform a decoding operation and a reproduced signal processing operation for sub-picture units. Sub-picture decoder 16 may control a display of sub-picture data to be switched on or off in accordance with a display control command designated by a sub-picture display control sequence (SP_DCSQ) to reproduce and display sub-picture data only for a part of a valid period of a sub-picture unit or stopping reproduction of sub-picture data. When sub-picture decoder 16 detects a display control command (DSP_CMD_OFF) designating a display-off during a procedure of decoding and reproducing, it stops a decoding and reproducing operation for the sub-picture data corresponding to a valid period designated by the display control command (DSP_CMD_OFF) while being stored in an internal buffer.

Control unit 22 may detect information about recording size (SPU_SZ) of a current sub-picture unit reproduced and displayed by sub-picture decoder 16, at desired intervals of time to read out the recording size (SPU_SZ) of a sub-picture unit. For example, intervals capable of detecting information about sub-picture unit header (SPUH) included in the sub-picture stream. Control unit 22 may then compare read-out recording size information with recording size information of the immediately previously reproduced and displayed sub-picture unit. When compared recording sizes are not equal, control unit 22 may discriminate that the current sub-picture data is new sub-picture data. Control unit 22 may store, in memory 23, information about playback time of a sub-picture unit detected by sub-picture decoder 16 (PTS_of_SPU. Control unit 22 may store information about recording start position of a detected sub-picture unit (SPU_SA) as search information adapted to search for an associated sub-picture unit.

In embodiments, reproduction time information and recording start position information can be stored at every sub-picture ON or OFF time point. In embodiments, a sub-picture data reproducing method for searching for sub-picture data (e.g., caption information) of diverse languages desired by the user may be based on stored search information. Embodiments relate to reproducing searched sub-picture data or repeatedly reproducing a desired block of searched sub-picture data.

FIGS. 5 to 8 are exemplary illustrations of different examples of sub-picture data searched for and repeatedly reproduced in an optical disc device. During a reproducing operation, control unit 22 may search for and read out recording size information (SPU_SZ # k) of a k-th sub-picture unit currently decoded, reproduced, and/or displayed by sub-picture decoder 16 at desired intervals of time. Control unit 22 may then compare read-out recording size information (SPU_SZ # k) with recording size information (SPU_SZ # k−1) of an immediately previously reproduced and displayed sub-picture unit (e.g., the k−1-th sub-picture unit) (①). When recording size information (SPU_SZ # k) of the k-th sub-picture unit does not correspond to recording size information (SPU_SZ # k−1) of the k−1-th sub-picture unit (SPU_SZ # k−1), it may be determined that the k-th sub-picture unit, which is currently reproduced and displayed, is a new sub-picture data different from the k−1-th sub-picture unit. Accordingly, control unit 22 may store recording size information (SPU_SZ # k), playback time information (PTS_of_SPU # k), and/or recording start position information SPU_SA # k of the k-th sub-picture unit in the memory 23 as search information (②).

When a predetermined user key, (e.g., a 'learning key') is subsequently inputted (③), control unit 22 may perform sequential sub-picture data searching and reproducing operations in accordance with embodiments of the present invention. Control unit 22 may search for and read out most recently-stored search information from memory 23 at a point in time when a 'learning key' is inputted. Control unit 22 may then search for a recording start position of a k-th sub-picture data corresponding to search information (②). Accordingly, it may be possible to reproduce (play back) and/or display sub-picture units having time continuity. For example, sub-picture units corresponding to caption information of a complete sentence such as "How are you?", starting from a start portion of a start sub-picture unit.

Figure 6:
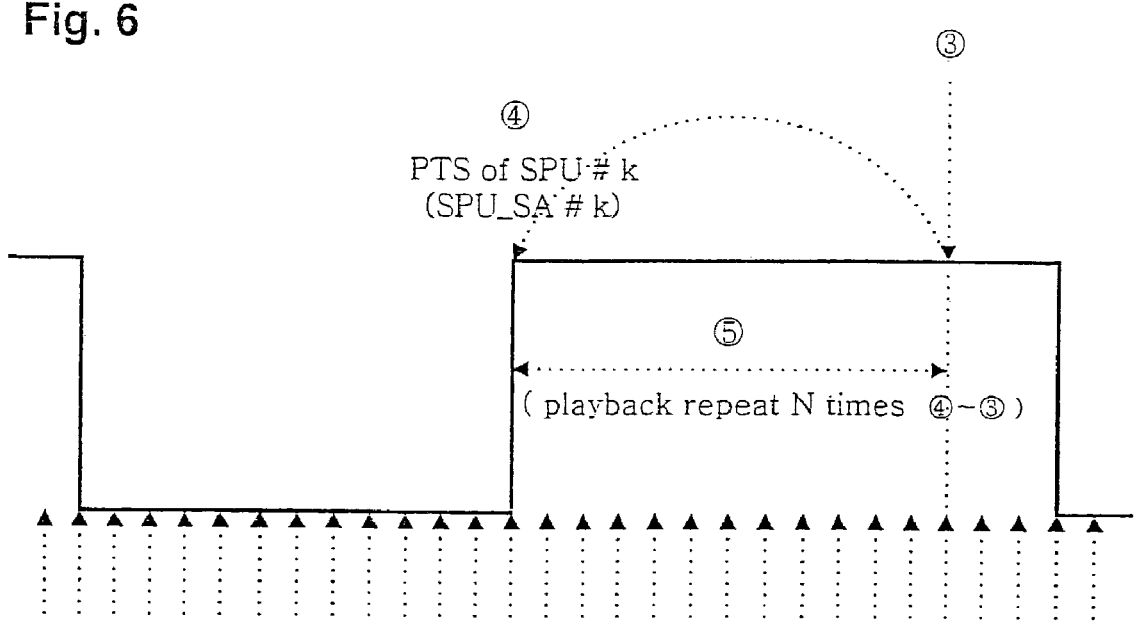
Figure 7:
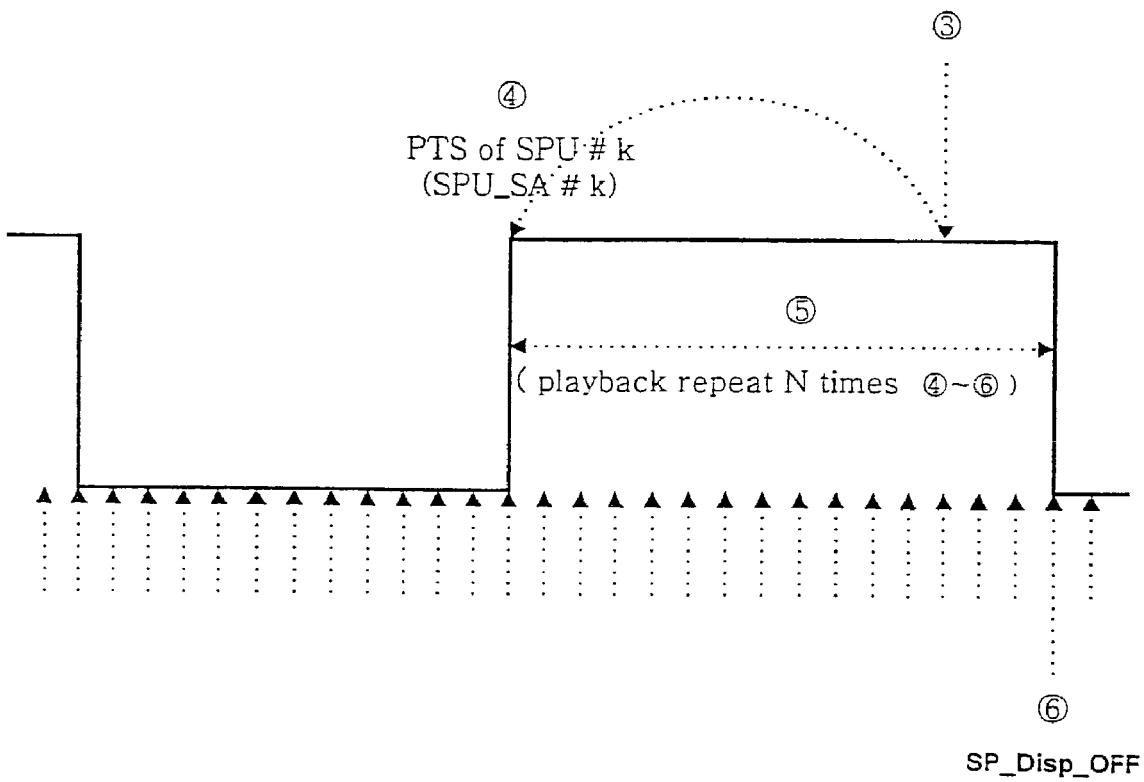
Figure 8:
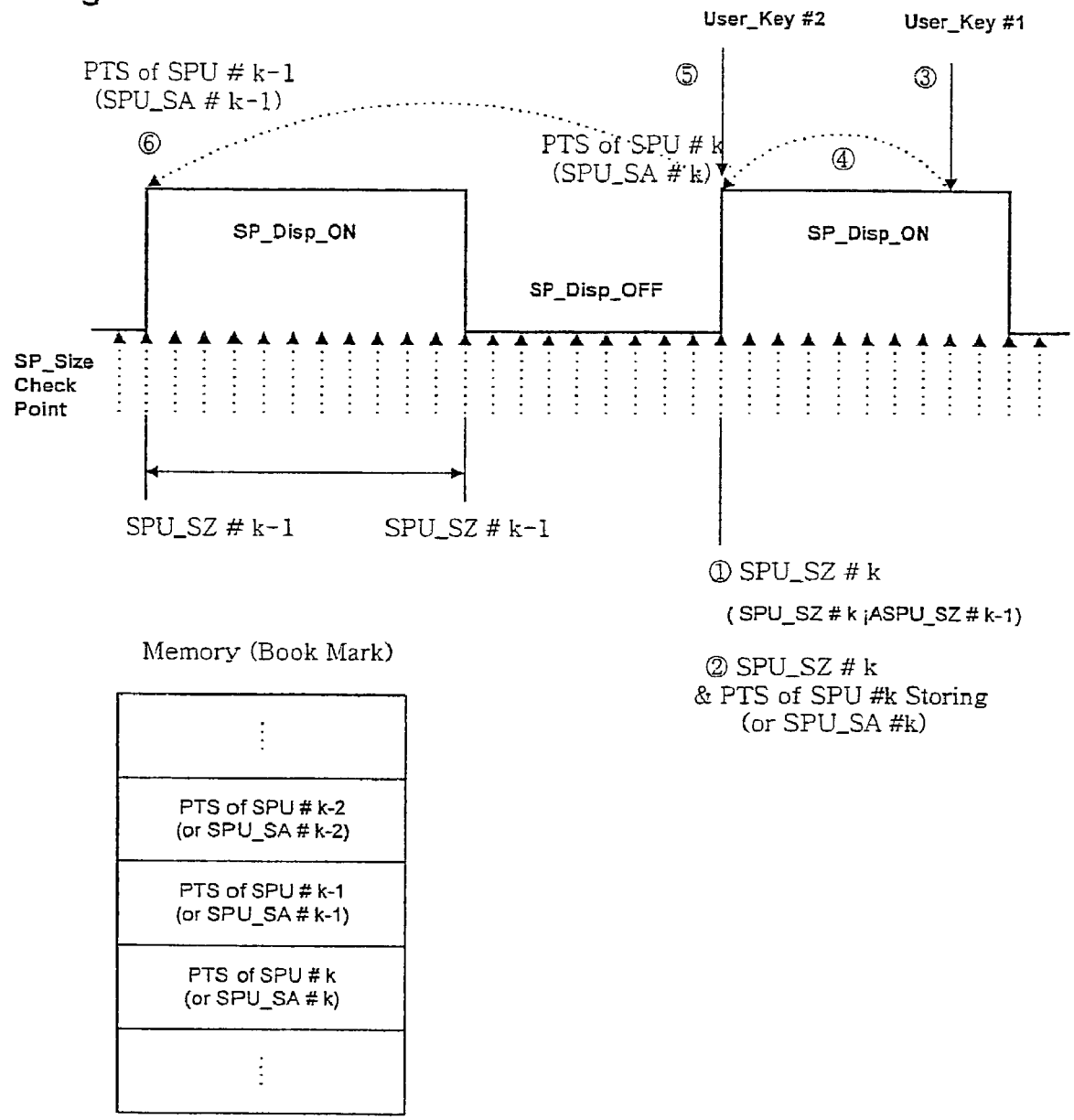

In accordance with embodiments of the present invention, when a 'learning key' from a user is inputted (③), control unit 22 temporarily stores recording position of current sub-picture data reproduced and displayed at a point of time when a 'learning key' is inputted, as illustrated in exemplary FIG. 6. Control unit 22 may also search for and read out most recently-stored search information from memory 23 at a point in time when a 'learning key' is inputted. Control unit 22 may then search for a recording start position of a k-th sub-picture data corresponding to search information (④). Reproduction and display of sub-picture data may then be carried out, starting from a recording start position of a searched k-th sub-picture data. Control unit 22 may perform sequential block repeat playback operations for repeatedly playing back at least one time, a desired sub-picture data block between point of time ④ and point of time ③. In embodiments, the number of repeat times is set by a user. In accordance with embodiments of the present invention, when a 'learning key' from a user is inputted (③), control unit 22 may search for and read out most recently-stored search information from memory 23 at a point in time when the 'learning key' was inputted. Control unit 22 may search for a recording start position of a k-th sub-picture data corresponding to search information (④) and may then reproduce and display sub-picture data starting from the recording start position of the searched k-th sub-picture data, as illustrated in exemplary FIG. 7. Control unit 22 may perform sequential block repeat playback operations until a display control command (DSP_CMD_OFF) designating a display-off of read-out and reproduced sub-picture data is detected (⑥). Control unit 22 may performs sequential block repeat playback operations for repeatedly playing back at least one time, a desired sub-picture data block between point of time ④ and point of time ⑥ in accordance with the number of repeat times set by a user.

In accordance with embodiments of the present invention, when a 'learning key' from a user is inputted (③), control unit 22 searches for and reads out most recently-stored search information from memory 23 at the point of time when a 'learning key' is inputted. Control unit 22 may search for a recording start position of a k-th sub-picture data corresponding to search information (④). Control unit 22 may then reproduce and display sub-picture data starting from a recording start position of a searched k-th sub-picture data, as illustrated in exemplary FIG. 8. When a 'learning key' is inputted one more time, control unit 22 may perform sequential sub-picture data searching and reproducing operations. Control unit 22 may search memory 23 and read out playback time information or recording start position information of a previously reproduced and displayed k−1-th sub-picture data (⑥). Control unit 22 may reproduce and display sub-picture data, starting from a recording start position of a searched k−1-th sub-picture data. In accordance with a number of repeated 'learning key' inputs, a corresponding sub-picture data may be searched for and reproduced. Accordingly, it may be possible to more rapidly and accurately search for and repeatedly play back a previously reproduced and displayed sub-picture data. Therefore, it may be possible to easily search for and play back sub-picture data of a desired caption information without any requirement for a user to enter a key input several times.

Figure 9:
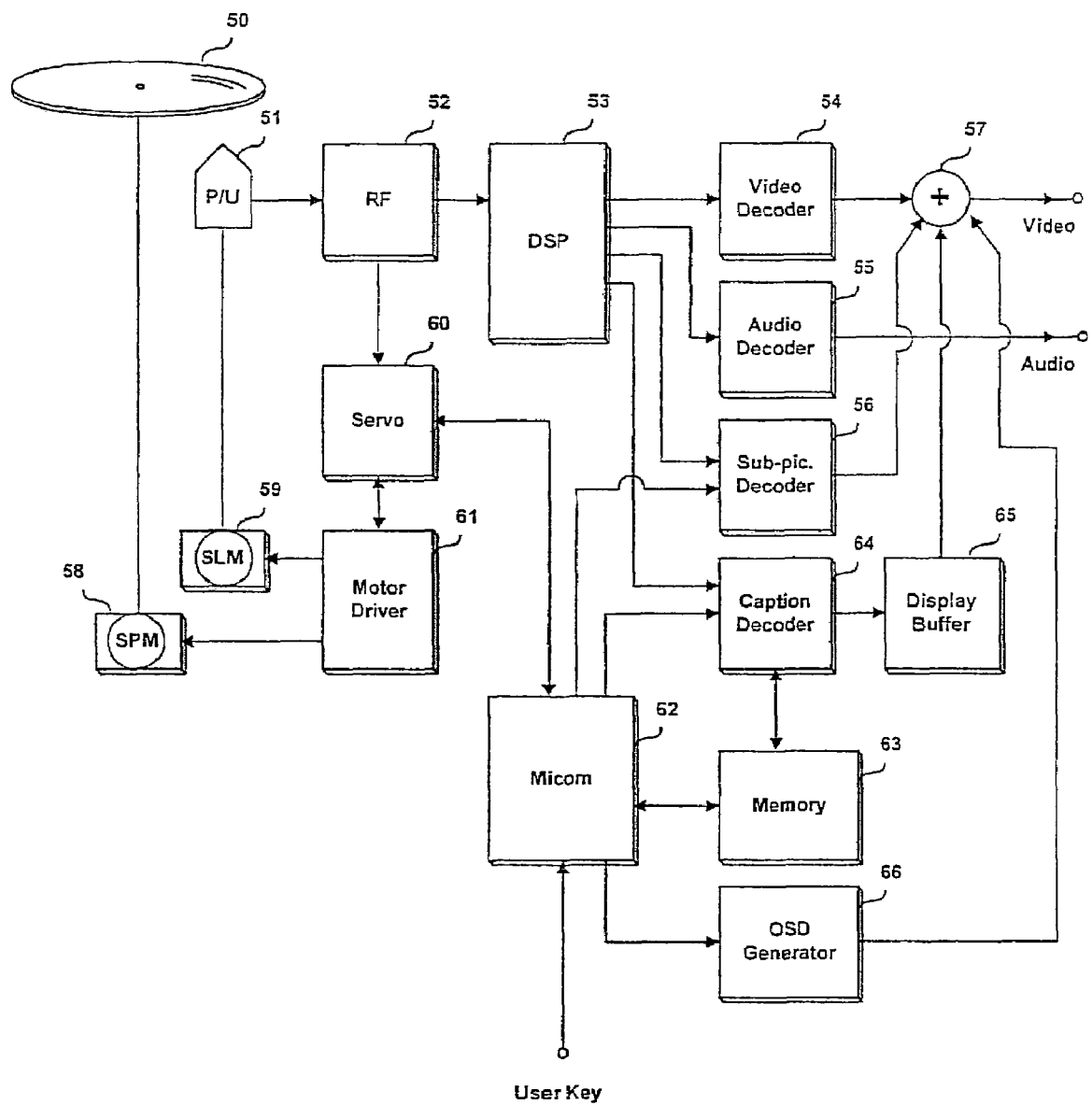
FIG. 9 is an exemplary block diagram illustrating a configuration of an optical disc device.

Embodiments of the present invention relate to a multi-text displaying method. In embodiments, the method is applicable to an optical disc device (e.g., DVD player). As illustrated in exemplary FIG. 9, a DVD player may include an optical pickup (P/U 51, an RF signal processing unit 52, a digital signal processing unit 53, a video decoder 54, and/or an audio decoder 55. A DVD player may read out and reproduce video and/or audio data streams recorded on optical disc 50.

A DVD player may also include a sub-picture decoder 56, a caption decoder 64, and a display buffer 65. Sub-picture decoder 56 may be for reproducing and signal-processing sub-picture data (e.g., caption information of diverse languages) recorded on the optical disc 50. Caption decoder 64 may be for reading out caption data included in a video data stream recorded in optical disc 50, reproducing read-out caption data, and signal-processing read-out caption data. Display buffer 65 may be for outputting and displaying a caption image of caption data.

A DVD player may further include a spindle motor 58, a sled motor 59, optical pickup 51, motor driving unit 61, servo unit 60, a memory 63, and/or on-screen-display (OSD) generating unit 66. Spindle motor 58 may be for rotating an optical disc. Sled motor 59 may be for shifting a position of optical pickup 51. Motor driving unit 61 and/or servo unit 60 may be for driving and controlling spindle motor 58 and sled motor 59. Control unit 62 may be for controlling operations. Memory 63 may be for storing information required for a control operation. On-screen-display (OSD) generating unit 66 may be for generating and outputting an OSD image.

When a predetermined user key (e.g., a 'multi-text key') is inputted during a reproducing operation, control unit 62 may control display of text images of sub-picture data and/or caption data read out from optical disc 10 in the form of different languages. A display image may be in such a fashion that a text image of a sub-picture data may be displayed in a user's own language (e.g., the native language of a user) whereas text image of caption data is displayed in a language foreign to the user. Before control unit 62 performs a multi-text displaying operation, it may store (for backup) information about a current display environment set by a user (e.g., sub-picture data display-on/off state and language information) in memory 23. This information may be stored so that when a multi-text displaying operation is complete, a display environment may be recovered to a display environment set by a user.

Figure 10:
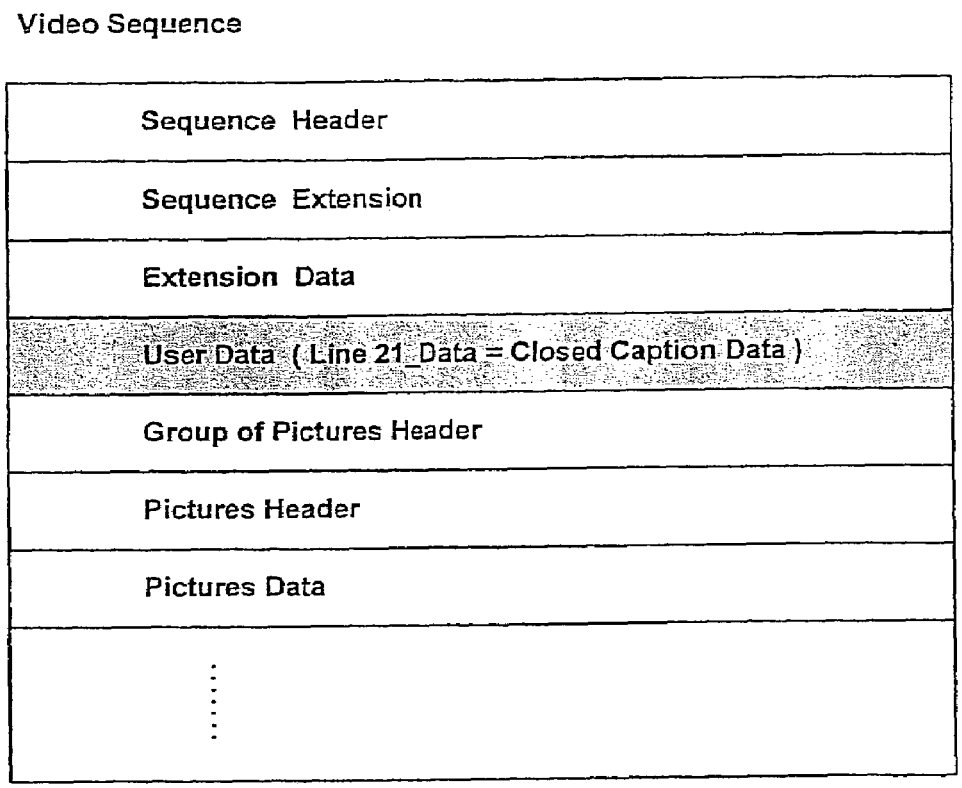
FIG. 10 is an exemplary diagram illustrating a recording format of caption data.

Caption data may be included in a video data stream recorded as a main title in optical disc 50. FIG. 10 is an exemplary illustration of a video sequence which is a logic file demodulated from a video data stream. As illustrated in FIG. 10, a video sequence may include a sequence header, a sequence extension, extension data, and/or user data. Caption data may be included in user data as data of a 21st line (Line 21_Data).

Figure 11:
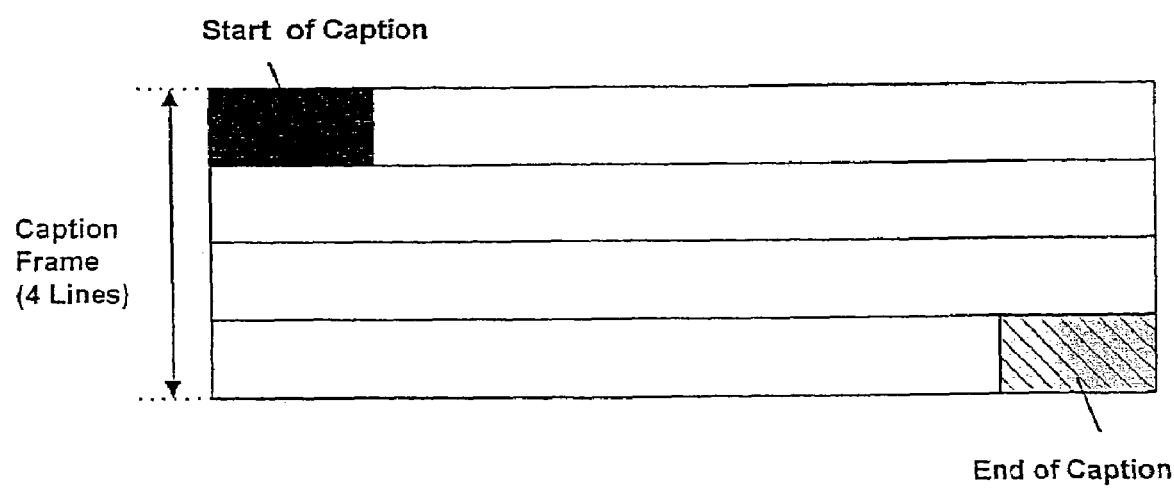
FIG. 11 is an exemplary diagram illustrating a structure of a caption frame.

As illustrated in exemplary FIG. 11, caption data read out as data of a 21st line in the user data may be accumulatively stored in display buffer 63 in a form of a caption frame having 4 lines, and may be subsequently outputted at a single time. Display buffer 65 may detect and identify information (Start of Caption) representing a start of caption data from demodulated data outputted from caption decoder 64. Display buffer 65 may be accumulatively stored, by frames, caption data received following a start of caption data. When display buffer 65 subsequently detects and identifies information (End_of_Caption) representing an end of the caption data, it outputs the accumulatively-stored caption frames at one time so that the frames are displayed in the form of a text image having a desired size.

Figure 12:
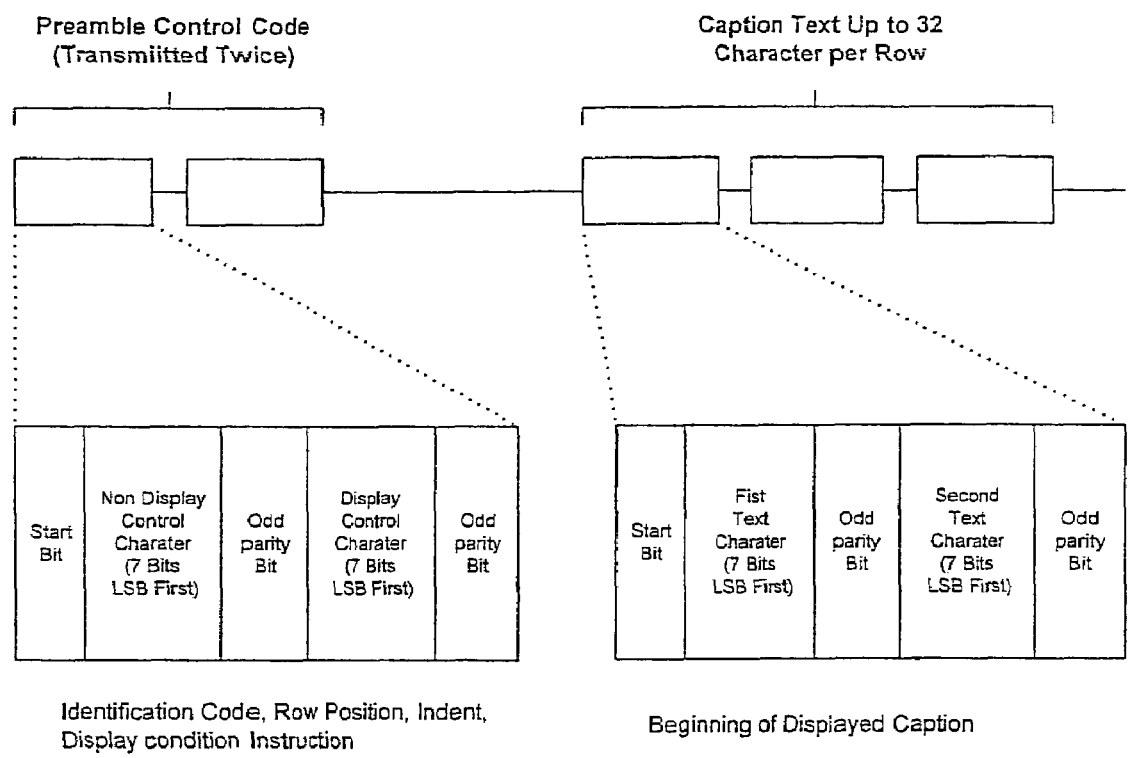
FIG. 12 is an exemplary diagram illustrating control code and text data of caption data.

FIG. 12 is an exemplary illustration of caption data, which may be included in user data and may include a preamble control code substantially identical or similar to caption data transmitted while being included in a general analog image signal and a caption text of up to 32 characters per row. Embodiments of the present invention relate to a method for selectively demodulating text images of caption data and sub-picture data into text images of different languages. In embodiments, this is in response to a 'multi-text' key entered by a user. Some embodiments relate to displaying both demodulated text images on a single screen of a general TV.

Figure 13:
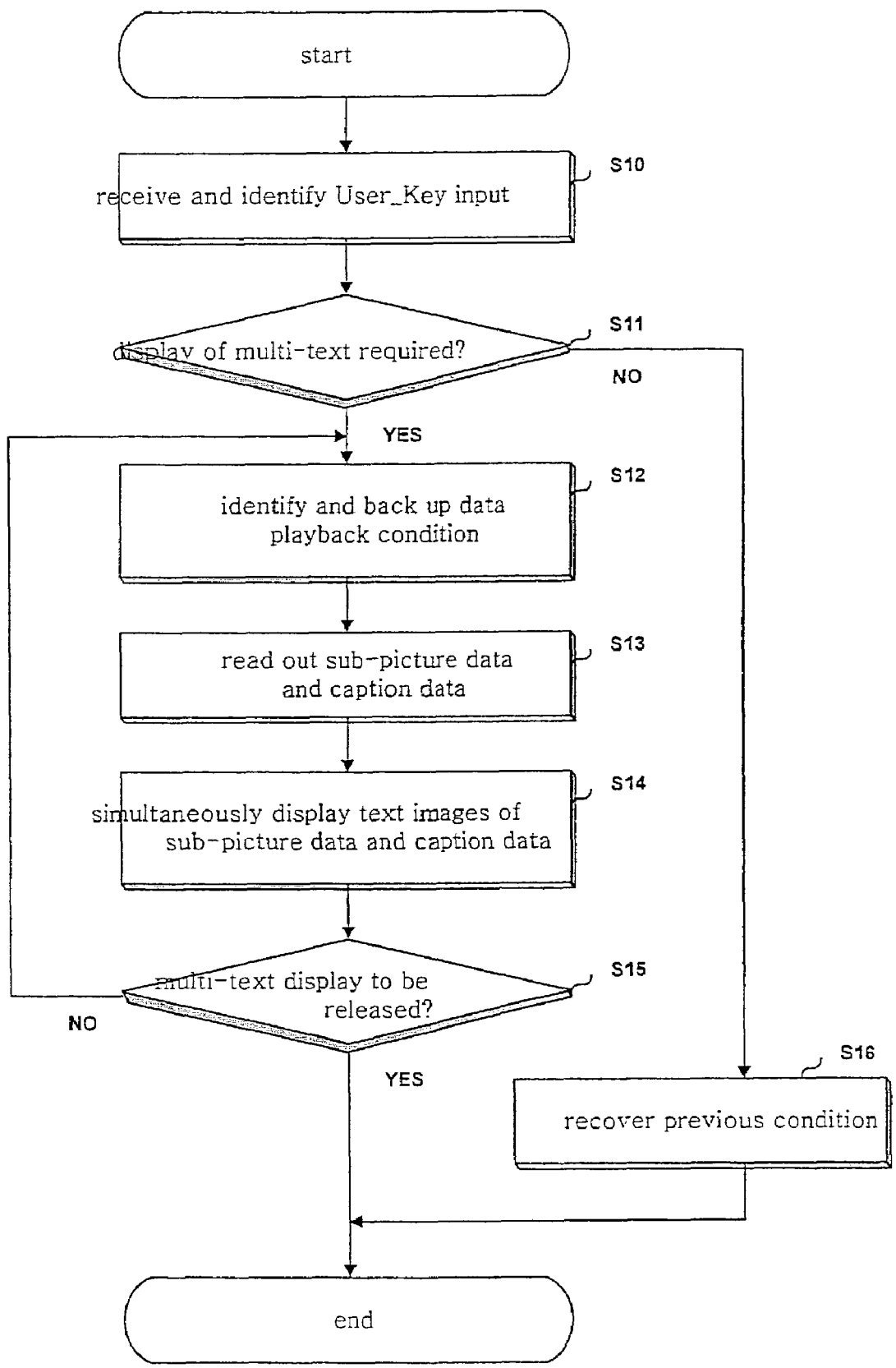
FIG. 13 is an exemplary flow chart illustrating a multi-text displaying method.

FIG. 13 is an exemplary flow chart illustrating a multi-text displaying method in an optical disc apparatus in accordance with embodiments of the present invention. Control unit 62 may cause an apparatus to perform a playback operation for reading out and reproducing video and/or audio data recorded on optical disc 50 (Step S10). When a predetermined user key (e.g., a 'multi-text' key), is entered by a user during playback operation, control unit 62 may determine that a multi-text displaying operation for simultaneously displaying text images of caption data and sub-picture data has been requested (Step S11). Control unit 62 may detect and identify a data playback condition set by a user before inputting a multi-text key. Data playback condition may include display-on/off of sub-picture data and language information of sub-picture data being reproduced in accordance with a selection thereof by a user. Control unit 62 may store (back-up) identified information in memory 63 (Step S12).

Control unit 62 may control sub-picture decoder 56 and caption decoder 64 to read out sub-picture data recorded in optical disc 50 as a subtitle (Step S13). Caption data may be included in a video data stream recorded in optical disc 50 as a main title. Control unit 62 may display, on a screen, text image of caption data demodulated and signal-processed by caption decoder 64. At substantially the same time, control unit 62 may display a text image of sub-picture data demodulated and signal-processed, by sub-picture decoder 56. The data from sub-picture decoder 56 may use a language different from that of the text image of the caption data (e.g., a native language). A native language may be set in a process of manufacturing an optical disc device or set by a user.

Figure 14:
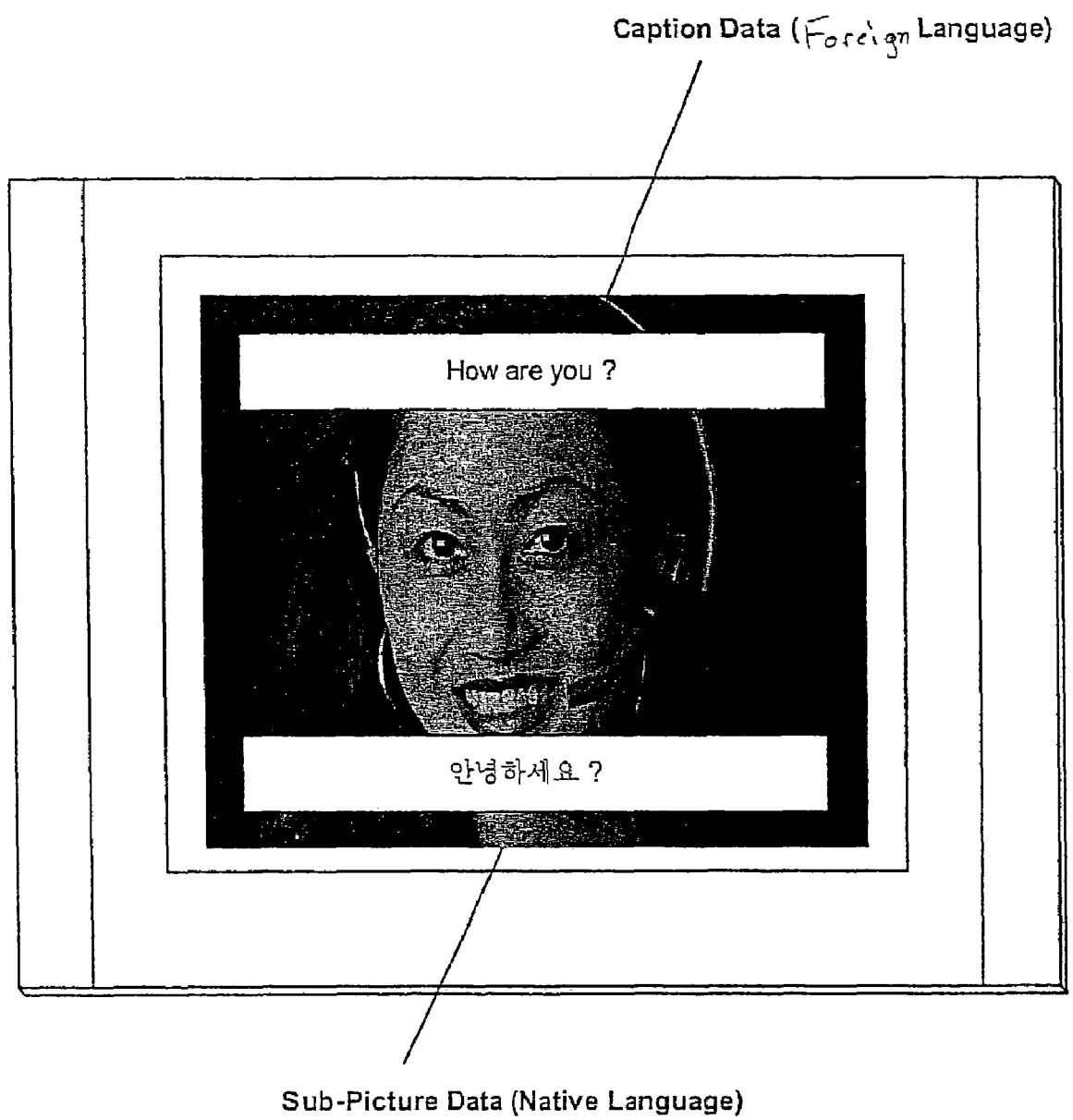
FIG. 14 is an exemplary view illustrating a sub-picture text image and caption text image displayed on a screen in accordance with a multi-text displaying method.

For example, a multi-text displaying operation may be requested under a condition in which Korean language is a native language. Text image of sub-picture data selectively displayed prior to inputting of a 'multi-text' key may correspond to a foreign language (e.g., French language). Control unit 62 may store in memory 63 information capable of identifying a type of language as French. Control unit 62 may detect and identify nation code information set in an optical disc device (e.g., 'Korea') and then read out and reproduces sub-picture data corresponding to Korean language, thereby displaying text images of Korean language. Control unit 62 may control overlapping timing of caption data and sub-picture data with a main image signal demodulated and reproduced by video decoder 54. Text image of sub-picture data corresponding to a native language and text image of caption data corresponding to a foreign language may be simultaneously displayed on a single screen of a general TV at different positions. As illustrated in exemplary FIG. 14, simultaneous display may be in such a fashion that a text image of caption data (e.g., a text image "How are you?") may be displayed near the top of a screen, whereas the text image of sub-picture data (e.g., "안녕하세요?" in Korean text) may be displayed near the bottom of the screen (Step S14).

A request to release multi-text may be made when a multi-text image is displayed (Step S15). Control unit 62 may detect and identify back-up information stored in memory 63 (e.g., display-on/off state of sub-picture data and nation language information stored prior to the multi-text displaying operation) and may recover a previous condition (Step S16). A user may view both a text image of a native language and a text image of a foreign language on a screen of a TV, along with a high quality video image. Accordingly, it may be possible to achieve an enhancement in language learning efficiency. Caption data representing a text image of a foreign language may be character data. An optical disc device may be equipped with an internal electronic dictionary database in order to allow a user to utilize a word search function.

Caption data may be recorded in a form of data made of capital letters of the English language. In order to provide convenience to users speaking languages other than the English language and unfamiliar with English capital letter fonts, font data of English capital letters may be stored while being mapped with font data of corresponding English small letters. When caption data of English capital letters is demodulated, font data of corresponding English small letters may be stored in a memory and may be read out in order to perform a font conversion operation for converting caption data of capital letters into caption data of small letters.

During a playback operation in an optical disc device (e.g., a DVD player) a caption data searching operation may be carried out. In a caption data searching operation, a control unit may read out caption data and store read-out caption data in a memory of an optical disc device. Optical disc device 21 may rapidly reproduce and output only caption data at a request of a user. Alternatively, a control unit may store, along with caption data, search information capable of searching for recording position of a video data stream including caption data. A control unit may automatically and rapidly search for a recording position where caption data corresponding to letters entered by a user is recorded on an optical disc. A control unit may then reproduce caption data.

Memory 63 may store caption data read out by caption decoder 64. Memory 63 may store search information capable of searching a recording position of a video data stream including caption data (e.g., a recording position address or presentation time stamp (PTS) of a video data stream). In memory 63, caption data may be stored by recording units of a desired recording size (e.g., caption data entries Caption_Data_Entry) having time continuity. Search information may be a recording start position information (Start_Address) of each caption data entry (Caption_Data_Entry) and/or start presentation time stamp information (Start_PTS). Search information may have a value corresponding to a recording position information or representation time stamp information of a video data stream including leading caption data of an associated caption data entry.

A user may selectively enter a particular key (e.g., a 'caption search key'). Control unit 62 may control an OSD generating unit 66 to display a letter input window on an OSD screen of an externally-connected appliance (e.g., a general TV). Control unit 62 may perform a caption data searching operation for searching memory for caption data corresponding to letters inputted through a letter input window. A caption data search operation may read out and identify search information stored in association with searched caption data. A caption data search operation may rapidly search for a recording position of caption data on an optical disc based on an identified search information, while displaying caption data.

Figure 16A:
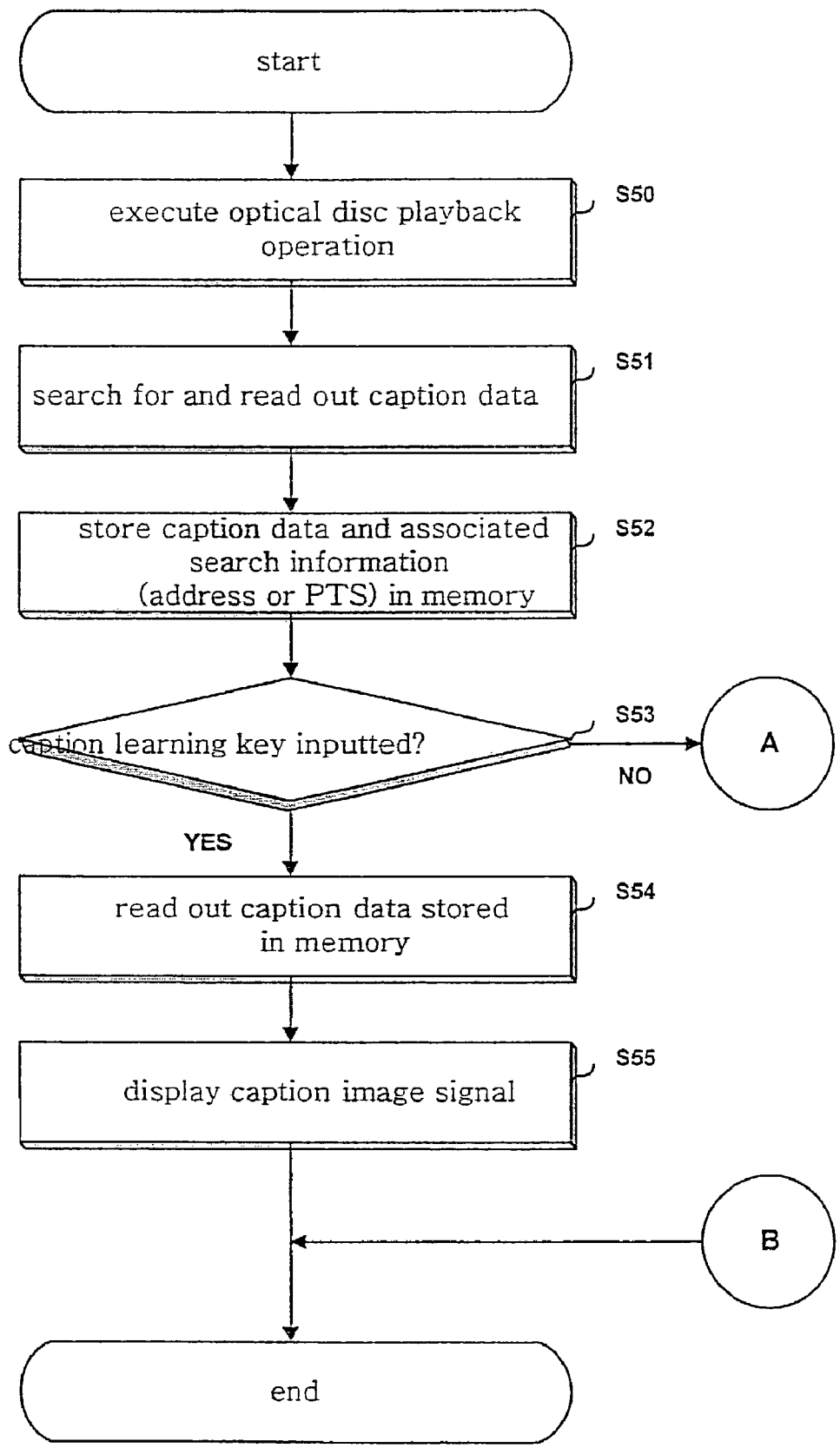
FIGS. 16a and 16b are exemplary flow charts respectively illustrating caption data reproducing and searching procedures.
Figure 16B:
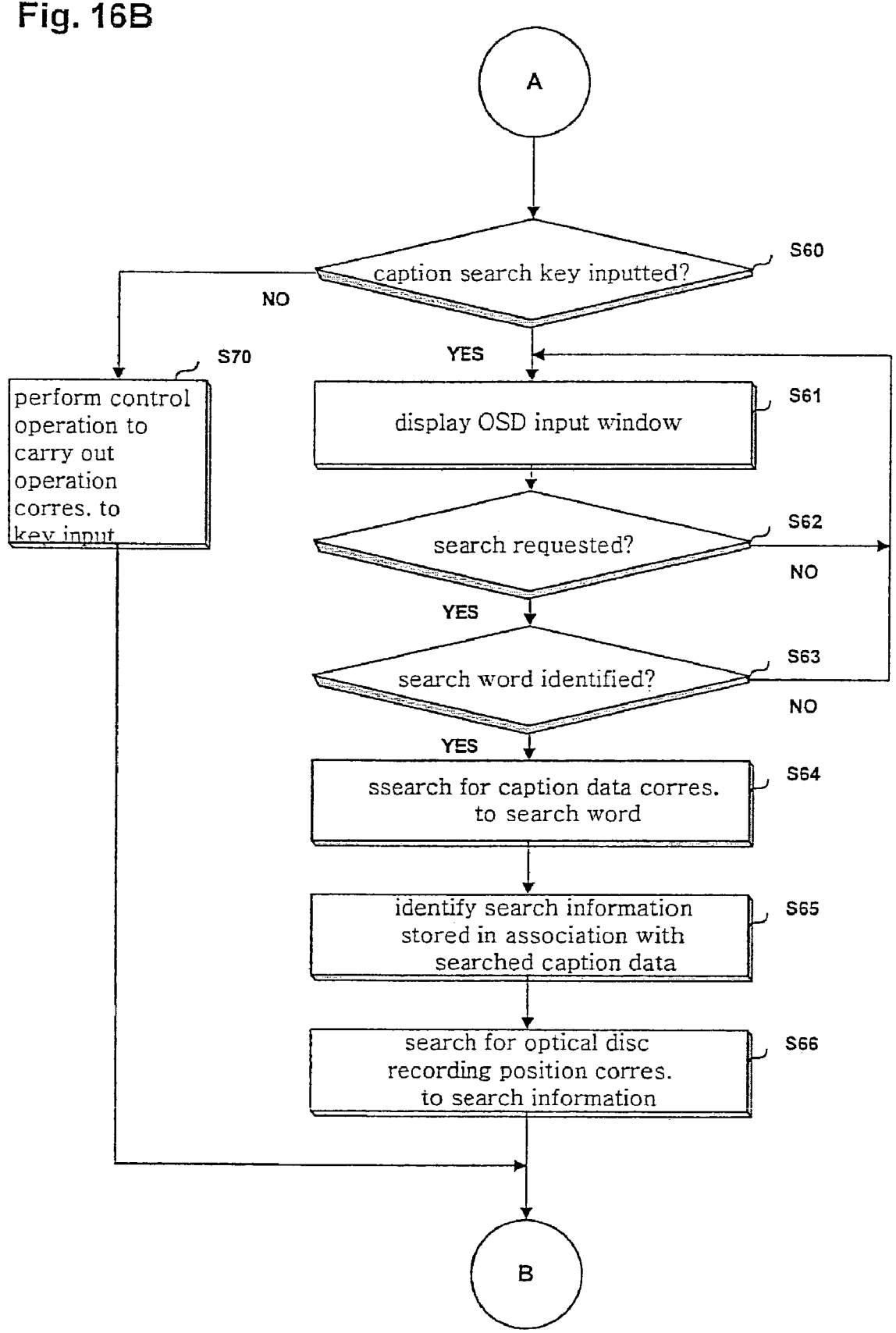

Exemplary FIGS. 16*a* and 16*b* illustrate performance of sequential operations for reading out and reproducing video and audio data streams from an optical disc (e.g., a DVD) loaded in an optical disc player (Step S50). Caption decoder 64 may search for and read out caption data included in a video data stream as user data (User_Data) (Step S51). Caption decoder 64 may store caption data in memory 63 (Step S52). At step S52, caption decoder 64 may also search for recording position information or presentation time stamp information of a video data stream included in caption data and store searched information in association with caption data.

Exemplary FIG. 15 illustrates caption data stored in memory 63 by caption data entries (Caption_Data_Entry) having a time continuity while having a desired recording size. Search information may be stored in association with each caption data entry. Search information may be a video data stream including leading caption data of an associated caption data entry. A caption data entry may include a recording start position information [Start_Address] and/or start presentation time stamp information [Start_PTS] of a video object unit (VOBU) having a desired recording size. When a predetermined key (e.g., a 'caption learning key') is inputted, control unit 62 may determine that a caption learning mode corresponding to a caption learning key is requested by a user (Step S53). In this case, control unit 62 may stop normal playback operation and may control operation of caption decoder 64. Under control of control unit 62, caption decoder 64 may sequentially read out caption data stored in memory 63 (Step S54). Caption decoder 64 may perform a caption data reproducing operation for displaying a caption image (e.g., a text image), corresponding to the caption data through a screen of an externally-connected appliance (e.g., a general TV) (Step S55).

Figure 17:
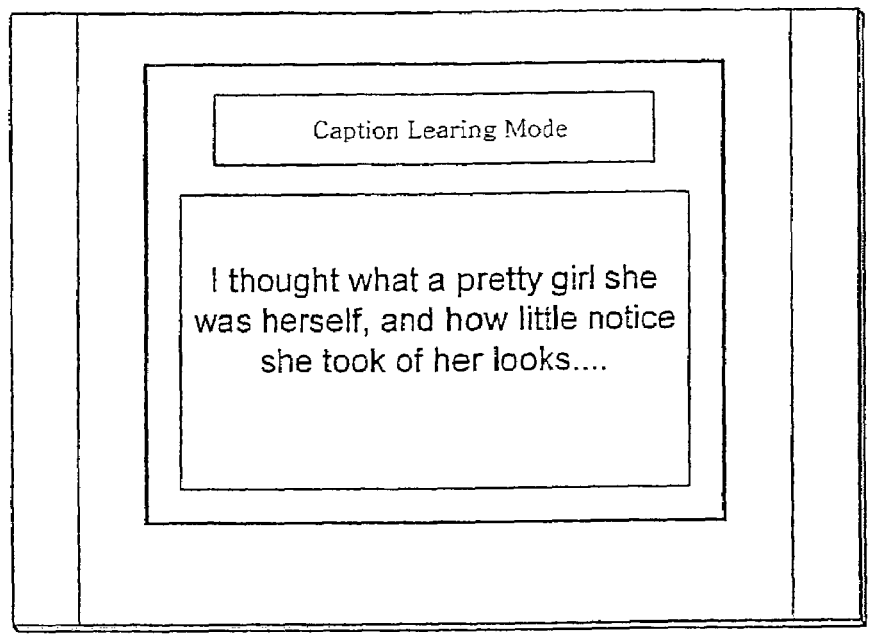
FIGS. 17 and 18 are exemplary views respectively illustrating TV screens corresponding to a caption learning mode.

Caption data may be reproduced and outputted by being signal-processed to display a text image having a size larger than the size of a text image set to be displayed along with a video image during a normal optical disc playback operation. For example, a size of a text image may be set to be displayed in an overlapping fashion on the upper or lower portion of a general TV screen. A large-size text image may be displayed, as illustrated in exemplary FIG. 17. Accordingly, a user may easily view and identify an increased number of caption letters on the same screen.

Figure 18:
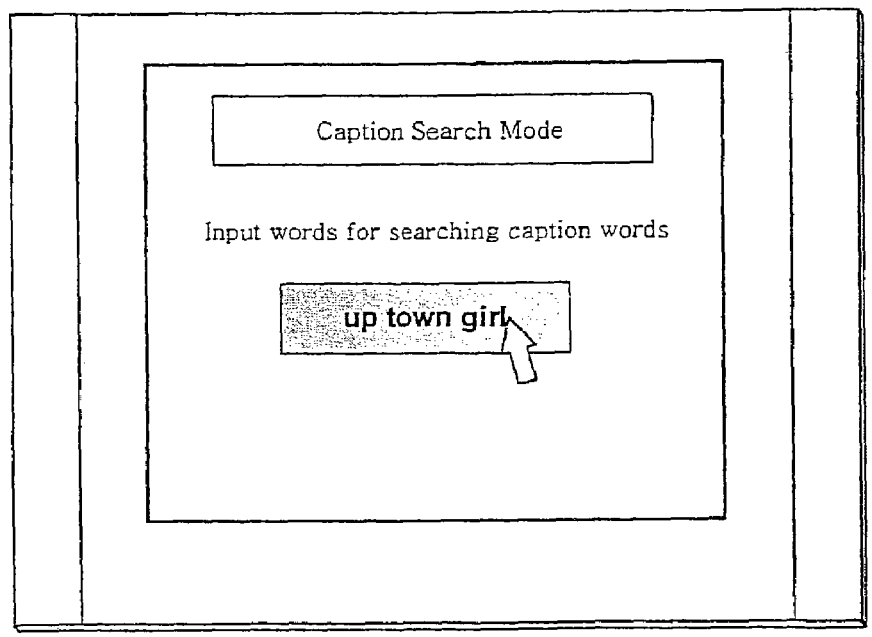

When a predetermined key, (e.g., a 'caption search key') is inputted, control unit 62 may determine that a caption searching mode corresponding to a caption search key is requested by a user (Step S60), as illustrated in exemplary FIG. 16*b*. In this case, control unit 62 may stop a normal playback operation and control OSD generating unit 66 to operate. When a key, other than a 'caption search key' is inputted, control unit 62 may perform a control operation to carry out an operation associated with the inputted key (Step S70). When OSD generating unit 66 operates under control of control unit 62, it may generate an OSD input window for inputting a search word (e.g., a key word) and may display the generated OSD input window on a TV screen (Step S61), as illustrated in exemplary FIG. 18.

When a search request key entered by a user is subsequently inputted (Step S62), control unit 62 may check whether or not there is a search word entered by a user and inputted through an OSD input window (Step S63). When there is a search word entered by a user, control unit 62 may perform a caption data searching operation for searching memory 63 to determine whether or not there is caption data corresponding to the search word (Step S64). When memory is stored with caption data corresponding to a search word entered by a user, control unit 62 may search for and identify search information stored in association with caption data (Step S65). Using identified search information (e.g., identified recording position information or presentation time stamp information) control unit 62 may search for a recording position of an associated video data stream recorded in DVD 10 (Step S66).

In embodiments, control unit 62 may search for and identify a recording start position information (Start_Address) of a caption data entry (Caption_Data_Entry) including caption data corresponding to a search word. Control unit 62 may control its servo unit 20 so that optical pickup 51 searches for a recording position of a video data stream having an identified recording start position information (Start_Address). Control unit 62 may cause automatic performance of a normal reproducing operation for reading out and reproducing video and/or audio data streams, starting from a searched recording position.

Control unit 62 may search for and identify a start presentation time stamp information (Start_PTS) of a caption data entry (Caption_Data_Entry) including caption data corresponding to a search word. Control unit 62 may control its servo unit 20 so that optical pickup 51 searches for a recording position of a video data stream having identified start presentation time stamp information (Start_PTS). Control unit 62 may cause automatic performance of a normal reproducing operation for reading out and reproducing video and/or audio data streams, starting from a searched recording position.

In accordance with embodiments of the present invention, it may be possible to rapidly output only caption data under conditions in which a normal reproducing operation is stopped. It may also be possible to automatically and rapidly search for a recording position of a video data stream where a caption data corresponding to letters desired by a user is recorded and reproduce the caption data.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for reproducing sub-picture data in an optical disc device comprising:
   displaying sub-picture units on a screen;
   storing, on the optical disc device, a recording start position of each of the sub-picture units at a point in time when the sub-picture unit is displayed on the screen;
   receiving a predetermined user key input while displaying the sub-picture unit on the screen;
   searching for the recording start position of a sub-picture unit corresponding to search information generated in accordance with the received predetermined user key input, wherein the searched recording start position corresponds to a recording start position of the sub-picture unit being currently displayed when the user key input is received; and
   reproducing sub-picture data starting from the searched recording start position, wherein the storing comprises:

storing a recording size of each of the sub-picture units displayed on the screen, storing search information associated with the each of the sub-picture units, comparing a recording size of successively inputted sub-picture units with the stored recording size of the sub-picture units, determining that successively inputted sub-picture units are new sub-picture units having new data when the comparing determines that the recording size of one of the successively inputted sub-picture units is different than the stored recording size of the sub-picture units, and storing the recording size of the successively inputted sub-picture units along with search information associated with the successively inputted sub-picture units when the successively inputted sub-picture units are determined to be new sub-picture units having new data, wherein the storing the recording size of the successively inputted sub-picture units is carried out to determine that new sub-picture data is displayed when the recording size of a current sub-picture unit does not correspond to the recording size of a sub-picture unit immediately preceding the current sub-picture unit.

2. The method according to claim 1, wherein the storing the recording size of each of the sub-picture units displayed on the screen comprises sampling header information of the sub-picture unit at intervals shorter than a readable interval to detect and to identify information about the recording size of the sub-picture unit.

3. The method according to claim 1, wherein the recording size of the sub-picture unit is detected and identified based on sub-picture unit size information of 2 bytes included in a header of the sub-picture unit.

4. The method according to claim 1, wherein the search information is presentation time stamp information or the recording start position information of the sub-picture unit.

5. The method according to claim 1, wherein the storing the recording size of the successively inputted sub-picture units comprises:

reading out search information most recently recorded at a point of time when the predetermined user key is inputted, searching for a recording start position of the sub-picture unit corresponding to the read-out search information, and reproducing the sub-picture data starting from the searched recording start position.

6. The method according to claim 1, wherein the storing the recording size of the successively inputted sub-picture units comprises:

sequentially searching for and reading out most recently-stored previous search information in accordance with a point of time when the predetermined user key is inputted and a number of inputting times of the predetermined user key, searching for the recording start position of the sub-picture unit corresponding to the read-out search information, and reproducing the sub-picture data starting from the searched recording start position.

7. The method according to claim 1, wherein the storing the recording size of the successively inputted sub-picture units comprises:

temporarily storing, in response to the inputting of the predetermined user key, a recording position corresponding to the point of time when the predetermined user key is inputted, reading out most recently-stored search information, searching for the recording start position of the sub-picture unit corresponding to the read-out search information, and repeatedly reproducing, at least one time, a sub-picture data block from the searched recording start position to the stored recording position.

8. The method according to claim 1, wherein the storing the recording size of the successively inputted sub-picture units comprises:

reading out search information most recently recorded at a point of time when the predetermined user key is inputted, searching for a recording start position of the sub-picture unit corresponding to the read-out search information, and reproducing the sub-picture data starting from the searched recording start position so that a sub-picture data block from the searched recording start point to the point of time when the sub-picture unit is displayed off is repeatedly reproduced at least one time.

9. The method according to claim 1, further comprising: displaying, along with the sub-picture units, a text image of caption data on a single screen.

10. The method according to claim 9, wherein the displaying a text image comprises:

reading out at least one of time information and position information capable of allowing a search for a recording position of a video data stream recorded in the optical disc while including the caption data, when the video data stream is reproduced for the read-out of the caption data, along with the caption data;

storing at least one of the read-out time information and position information in association with the caption data in a memory;

reading out the caption data stored in the memory;

signal-processing the read-out caption data to produce a corresponding text image; and displaying the produced text image through a screen of an appliance externally connected to the optical disc device.

11. The method according to claim 10, wherein the reading out the caption data comprises:

reading out the caption data stored in the memory in response to a key input entered by a user in a state in which a procedure of reproducing the video data stream is stopped; and signal-processing the read-out caption data to produce a corresponding text image.

12. The method according to claim 9, wherein the displaying a text image comprises:

reading out search information capable of allowing a search for a recording position of a video data stream recorded in the optical disc while including the caption data, when the video data stream is reproduced for the read-out of the caption data, along with the caption data, and storing the search information in association with the caption data in a memory;

displaying a letter input window capable of allowing a search for the caption data stored in the memory, through a screen of an appliance externally connected to the optical disc device;

searching the memory for caption data corresponding to letters inputted through the letter input window, and then reading out and identifying the search information corresponding to the searched caption data; and searching for the recording position of the video data stream including the caption data, based on the identified search information.

13. The method according to claim 12, wherein the search information is at least one of time information and position information capable of allowing a search for the recording position of the video data stream recorded in the optical disc while including the caption data.

14. The method according to claim 12, wherein when the recording position of the video data stream is searched by searching for the recording position of the video data stream, a playback operation of the optical disc is automatically executed, starting from the recording position.

* * * * *